(12) United States Patent
Hsiao et al.

(10) Patent No.: US 10,754,961 B2
(45) Date of Patent: Aug. 25, 2020

(54) DATA PROCESSING APPARATUS AND DATA PROCESSING METHOD FOR INTERNET OF THINGS SYSTEM

(71) Applicant: Institute For Information Industry, Taipei (TW)

(72) Inventors: Yu-Cheng Hsiao, Taipei (TW); Ying-Hsun Lai, Tainan (TW)

(73) Assignee: Institute For Information Industry, Taipei (TW)

( * ) Notice: Subject to any disclaimer, the term of this patent is extended or adjusted under 35 U.S.C. 154(b) by 137 days.

(21) Appl. No.: 16/200,642

(22) Filed: Nov. 26, 2018

(65) Prior Publication Data
US 2020/0134205 A1    Apr. 30, 2020

(30) Foreign Application Priority Data

Oct. 25, 2018 (TW) .............................. 107137785 A

(51) Int. Cl.
*G06F 21/60* (2013.01)
*G06F 16/22* (2019.01)
(Continued)

(52) U.S. Cl.
CPC .......... *G06F 21/602* (2013.01); *G06F 16/184* (2019.01); *G06F 16/2246* (2019.01);
(Continued)

(58) Field of Classification Search
CPC ............... G06F 21/602; G06F 16/2246; G06F 16/2255; G06F 16/184; H04L 9/0637;
(Continued)

(56) References Cited

U.S. PATENT DOCUMENTS 10,579,779 B2 * 3/2020 Wright .................... G06F 21/10
2007/0157302 A1 7/2007 Ottamalika et al.
(Continued)

FOREIGN PATENT DOCUMENTS

CN 107820690 A 3/2018
CN 107942718 A 4/2018
(Continued)

OTHER PUBLICATIONS

Search Report to the corresponding Great Britain Patent Application rendered by the Intellectual Property Office dated May 1, 2019, 5 pages.
(Continued)

*Primary Examiner* — Hee K Song
(74) *Attorney, Agent, or Firm* — Skaar Ulbrich Macari, P.A.

(57) ABSTRACT

A data processing apparatus and a data processing method thereof for an Internet of Things (IoT) system are provided. The data processing apparatus generates a plurality of diagnosis rule data, diagnoses each of the device data received from at least one IoT apparatus to generate a plurality of diagnosis log data, packages the device data, the diagnosis log data and the diagnosis rule data respectively based on a preset data amount to generate a plurality of device files, a plurality of diagnosis log files and a plurality of diagnosis rule files individually, stores each device file, each diagnosis log file and each diagnosis rule file in an interplanetary file system individually, and stores hash values of each device file, each diagnosis log file and each diagnosis rule file in a blockchain system individually.

16 Claims, 9 Drawing Sheets

(51) Int. Cl.
*G06F 16/182* (2019.01)
*H04L 9/06* (2006.01)
*H04L 9/14* (2006.01)
*H04L 9/30* (2006.01)
*H04L 9/32* (2006.01)

(52) U.S. Cl.
CPC ........ *G06F 16/2255* (2019.01); *H04L 9/0637* (2013.01); *H04L 9/14* (2013.01); *H04L 9/30* (2013.01); *H04L 9/3242* (2013.01); *H04L 2209/38* (2013.01)

(58) Field of Classification Search
CPC . H04L 9/14; H04L 9/30; H04L 9/3242; H04L 2209/38
See application file for complete search history.

(56) References Cited

U.S. PATENT DOCUMENTS

| 2009/0195394 A1* | 8/2009 | Johnson ................ G06Q 40/00 340/584 |
| 2018/0157700 A1 | 6/2018 | Roberts et al. |
| 2018/0287797 A1 | 10/2018 | Banerjee et al. |
| 2019/0332462 A1* | 10/2019 | Kono ..................... G06F 11/079 |
| 2020/0034548 A1* | 1/2020 | Wu ......................... H04L 63/20 |
| 2020/0148552 A1* | 5/2020 | Yizhack ................. C02F 1/008 |

FOREIGN PATENT DOCUMENTS

| CN | 108681569 A | 10/2018 |
| TW | 201812674 A | 4/2018 |
| TW | 201823988 A | 7/2018 |
| WO | 2018201797 A1 | 11/2018 |

OTHER PUBLICATIONS

Pourmajidi, William; Miranskyy, Andriy, "Logchain: Blockchain-Assisted Log Storage", 2018 IEEE 11th International Conference on Cloud Computing, Jul. 2018, pp. 978-982, 5 pages.

Machado, Caciano; Fröhlich, Antonio Augusto, "IoT Data Integrity Verification for Cyber-Physical Systems using Blockchain", 2018 IEEE 21st International Symposium on Real-Time Distributed Computing, May 2018, pp. 83-90, 8 pages.

Search Report to the corresponding Taiwan Patent Application rendered by the Taiwan Intellectual Property Office (TIPO) dated Oct. 25, 2018, 10 pages (including English translation).

* cited by examiner

DATA PROCESSING APPARATUS AND DATA PROCESSING METHOD FOR INTERNET OF THINGS SYSTEM

PRIORITY

This application claims priority to Taiwan Patent Application No. 107137785 filed on Oct. 25, 2018, which is hereby incorporated by reference in its entirety.

FIELD

The present invention relates to a data processing apparatus and a data processing method for an Internet of Things (IoT) system. Specifically, the data processing apparatus of the present invention stores device data received from an IoT apparatus, diagnosis results and diagnosis logs for the device data via an interplanetary file system and a blockchain system, thereby improving the extensibility of the IoT system and the security in data storage.

BACKGROUND

With the advancement of the science and technology, Internet of Things (IoT) apparatuses such as wearable apparatuses, sensing apparatuses or monitoring equipments or the like have found wide application in people's life. Device data of the IoT apparatuses is uploaded via a network to a cloud server provided by a service provider for storage and event rule analysis.

However, the device data of the IoT apparatus and the event rule thereof that are stored on the cloud server may be tampered by someone with a bad intention, and even if a verifying server is additionally established as data backup for verification, the verifying server may possibly be invaded by someone with the bad intention. Moreover, in recent years, the blockchain system provides a data storage mechanism of a higher security, but the device data traffic received by the cloud server from many IoT apparatuses is considerably large. If each device data is stored via the blockchain system, a high service charge (a charge for packaging each data by a miner) needs to be paid, thereby greatly improving the operating cost of the service provider. Moreover, the blockchain system currently available cannot achieve such frequent transaction (e.g., the amount of transactions per second of Ethereum is not more than 25), and particularly, the common bill mechanism thereof must exchange a large amount of data via a peer-to-peer network, so the amount of transactions per second is hard to be improved and thus cannot be applied to the IoT system.

Accordingly, an urgent need exists in the art to provide a data processing mechanism so as to improve the extensibility and the security in data storage of the IoT system.

SUMMARY

Provided is a data processing mechanism, which first respectively packages the device data of an IoT apparatus, the analysis rule and the analysis log thereof into files and stores the files in an interplanetary file system, and then calculates hash values of the files and stores the hash values in a blockchain system. Accordingly, the data processing mechanism may enable the blockchain system to be applicable in the IoT system without resulting in a high service charge, thereby reducing the operating cost of the service provider and improving the extensibility and the security in data storage of the IoT system.

The disclosure includes a data processing apparatus for an Internet of Things (IoT) system, which comprises a network interface, a storage and a processor. The network interface is connected to a network and connected to a blockchain system and an interplanetary file system via the network. The storage is configured to store a user database, and the user database records a diagnosis rule setting. The processor is electrically connected to the network interface and the storage and is configured to perform the following operations: receiving a plurality of device data from at least one Internet of Things (IoT) apparatus via the network interface, each of the device data having a time stamp, a device identifier and a piece of state information; generating a plurality of diagnosis rule data according to the diagnosis rule setting, wherein each of the diagnosis rule data recording a diagnosis rule, and each of the diagnosis rules being associated with one of the device identifiers; for each of the device data, diagnosing the state information by using the diagnosis rule associated with the device identifier to generate a diagnosis log data; packaging the device data based on a first preset data amount to generate a plurality of device files and a first hash value of each of the device files, storing each of the device files to the interplanetary file system, and storing each of the first hash values to the blockchain system through a smart contract; packaging the diagnosis log data based on a second preset data amount to generate a plurality of diagnosis log files and a second hash value of each of the diagnosis log files, storing each of the diagnosis log files to the interplanetary file system, and storing each of the second hash values to the blockchain system through the smart contract; and packaging the diagnosis rule data based on a third preset data amount to generate a plurality of diagnosis rule files and a third hash value of each of the diagnosis rule files, storing each of the diagnosis rule files to the interplanetary file system, and storing each of the third hash values to the blockchain system through the smart contract.

The disclosure also includes a data processing method for use in a data processing apparatus for an Internet of Things (IoT) system, the data processing apparatus comprises a network interface, a storage and a processor, the processor is electrically connected to the network interface and the storage, the network interface is connected to a network and connected to a blockchain system and an interplanetary file system via the network, the storage is configured to store a user database, the user database records a diagnosis rule setting, the data processing method is executed by the processor and comprises the following steps: receiving a plurality of device data from at least one Internet of Things (IoT) apparatus via the network interface, each of the device data having a time stamp, a device identifier and a piece of state information; generating a plurality of diagnosis rule data according to the diagnosis rule setting, wherein each of the diagnosis rule data recording a diagnosis rule, and each of the diagnosis rules being associated with one of the device identifiers; for each of the device data, diagnosing the state information by using the diagnosis rule associated with the device identifier to generate a diagnosis log data; packaging the device data based on a first preset data amount to generate a plurality of device files and a first hash value of each of the device files, storing each of the device files to the interplanetary file system, and storing each of the first hash values to the blockchain system through a smart contract; packaging the diagnosis log data based on a second preset data amount to generate a plurality of diagnosis log files and a second hash value of each of the diagnosis log files, storing each of the diagnosis log files to the interplanetary file system, and storing each of the second hash values to the blockchain system through the smart contract; and packaging the diagnosis rule data based on a third preset data amount to generate a plurality of diagnosis rule files and a third hash value of each of the diagnosis rule files, storing each of the diagnosis rule files to the interplanetary file system, and storing each of the third hash values to the blockchain system through the smart contract.

The detailed technology and preferred embodiments implemented for the subject invention are described in the following paragraphs accompanying the appended drawings for people skilled in this field to well appreciate the features of the claimed invention.

and

Figure 8A:
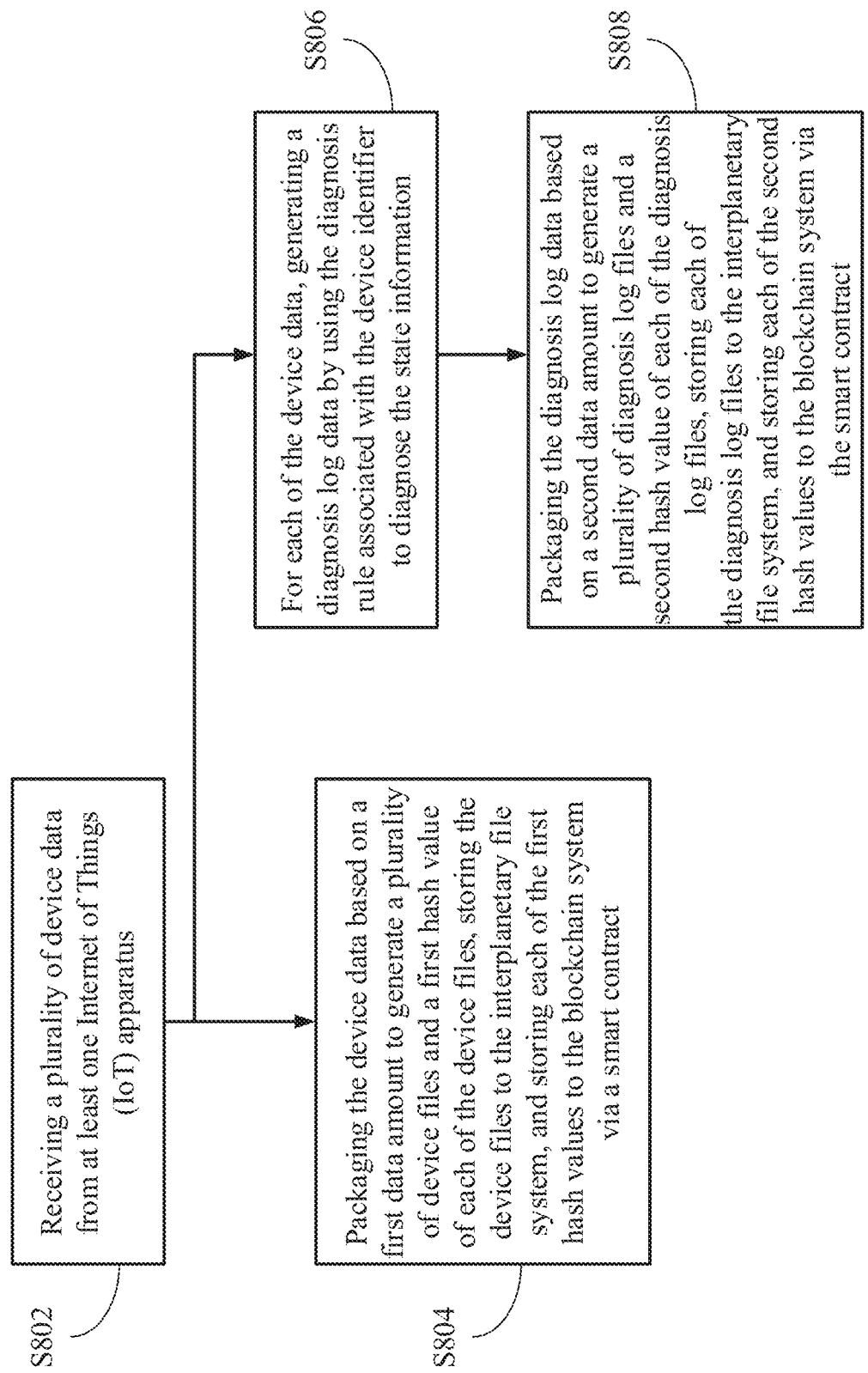
Figure 8B:
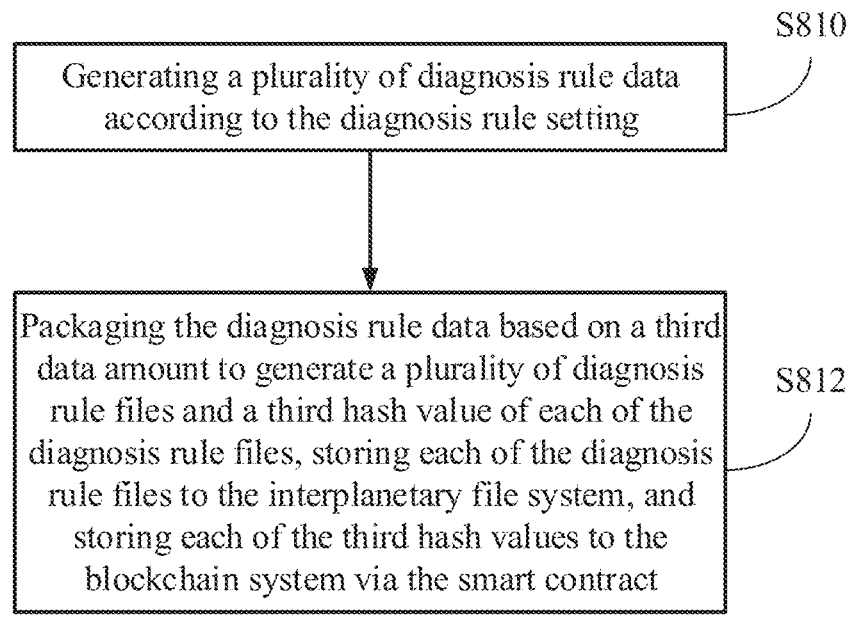

FIG. 8A to FIG. 8B are flowchart diagrams of a data processing method according to the present invention.

DETAILED DESCRIPTION

In the following description, the present invention will be explained with reference to certain example embodiments thereof. However, these example embodiments are not intended to limit the present invention to any particular example, embodiment, environment, applications or implementations described in these example embodiments. Therefore, description of these example embodiments is only for purpose of illustration rather than to limit the scope of the present invention.

It shall be appreciated that, in the following embodiments and the attached drawings, elements unrelated to the present invention are omitted from depiction; and dimensional relationships among individual elements in the attached drawings are provided only for ease of understanding, but not to limit the actual scale.

Figure 1:
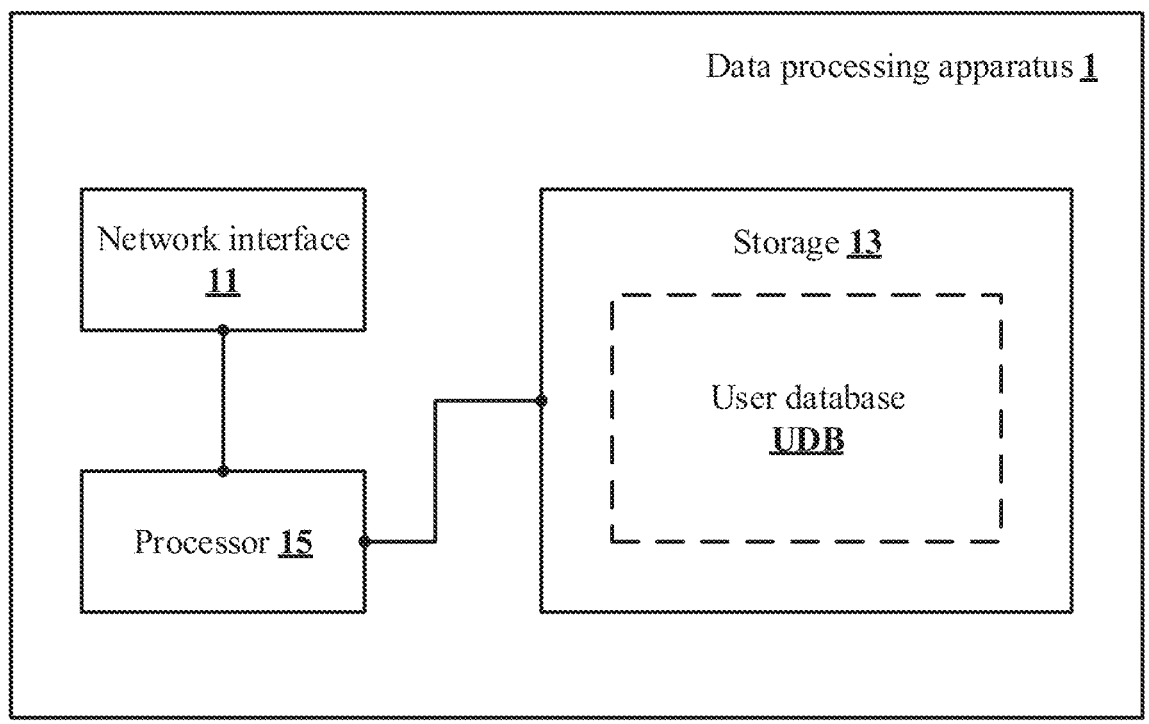
FIG. 1 is a schematic view of a data processing apparatus 1 according to the present invention.
Figure 2:
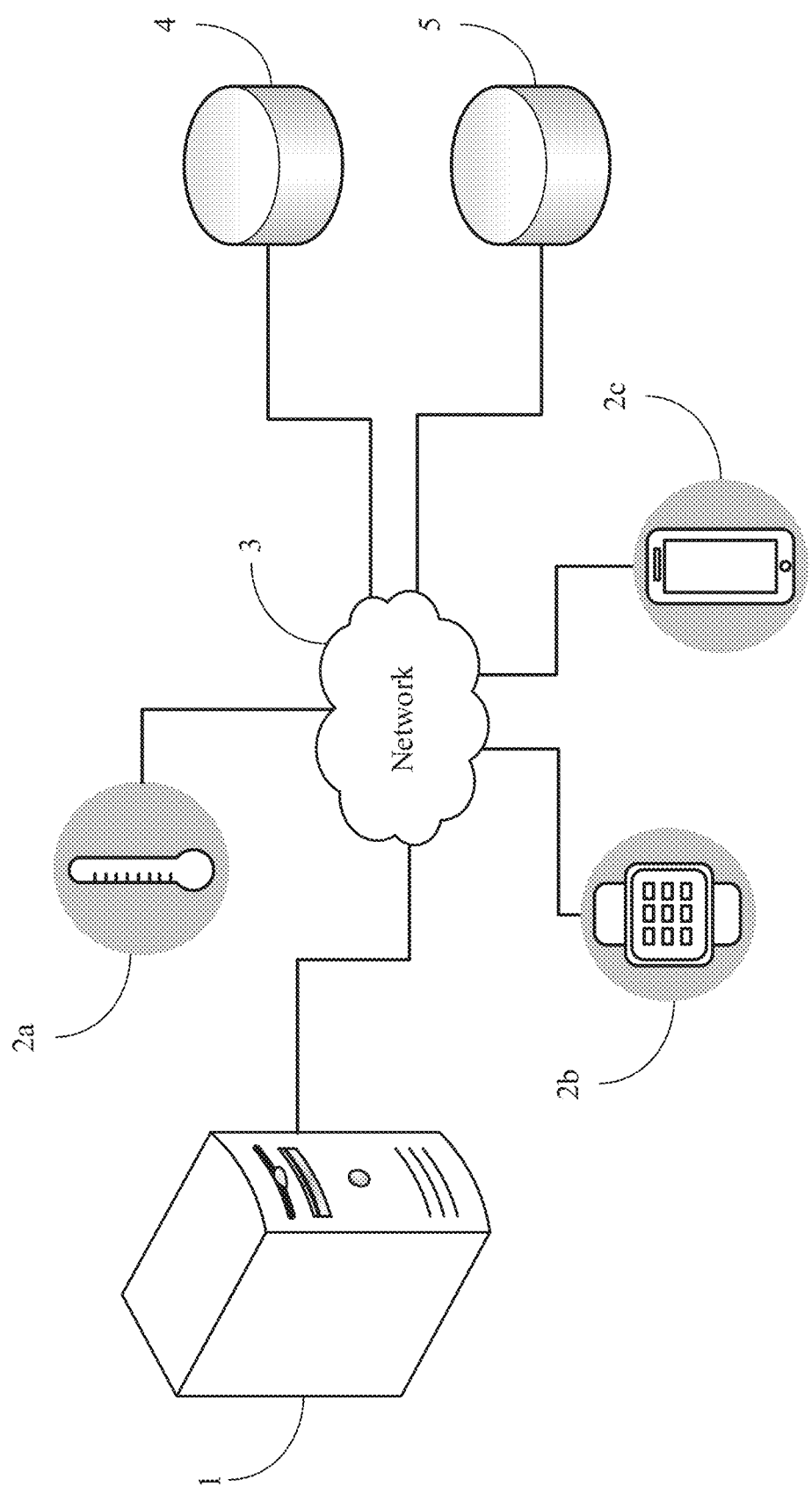
FIG. 2 is an implementation of an Internet of Things (IoT) system according to the present invention.

A first embodiment of the present invention is as shown in FIG. 1 to FIG. 6. FIG. 1 is a schematic view of a data processing apparatus 1 according to the present invention. The data processing apparatus 1 is adapted for use in an Internet of Things (IoT) system, as shown in FIG. 2. The IoT system may comprise at least one IoT apparatus (e.g., the IoT apparatuses 2a, 2b and 2c). For simplification of the description, only three IoT apparatuses 2a, 2b and 2c are depicted in FIG. 2. However, the number of the IoT apparatuses within the IoT system is not intended to limit the present invention.

The data processing apparatus 1 comprises a network interface 11, a storage 13 and a processor 15. The network interface 11 is connected to a network 3 and is connected to a blockchain system 4 and an interplanetary file system 5 via the network 3. The network interface 11 may be a wired network interface, a wireless network interface and a combination thereof, and it is connected to a network (e.g., an Internet, a local area network, a telecommunication network or a network of any combination thereof).

The storage 13 stores a user database UDB which records a diagnosis rule setting made by a user for the IoT apparatus within a specific time interval. The processor 15 is electrically connected to the network interface 11 and the storage 13. The processor 15 receives a plurality of device data from at least one IoT apparatus (e.g., the IoT apparatuses 2a, 2b and 2c) via the network interface 11. Each of the device data has a time stamp, a device identifier and a piece of state information. For example, when the IoT apparatus is a smart thermometer, the IoT apparatus may periodically or regularly transmit the device data to the data processing apparatus 1. When the IoT apparatus is a smart watch, the IoT apparatus may also transmit the device data to the data processing apparatus 1 in response to operations of the user of the smart watch in addition to periodically or regularly transmitting the device data. Implementations of transmitting the device data by various IoT apparatuses shall be appreciated by those of ordinary skill in the art, and thus will not be further described herein.

The processor 15 generates a plurality of diagnosis rule data according to the diagnosis rule setting, wherein each of the diagnosis rule data records a diagnosis rule and each of the diagnosis rules is associated with the device identifier of an IoT apparatus. For each of the device data, the processor 15 diagnoses the state information by using the diagnosis rule associated with the device identifier to generate a diagnosis log data. For example, referring to FIG. 2, if the IoT apparatus 2a is a smart thermometer, the user may log in the data processing apparatus 1 via the account and the password thereof. After the IoT apparatus 2a is registered with the data processing apparatus 1, the user may set the diagnosis rule of the IoT apparatus 2a to be that the temperature is lower than 20☐, and the diagnosis rule becomes valid at 09:00 a.m. and becomes invalid at 11:00 p.m.

At 09:00 a.m., the processor 15 initiates the set diagnosis rule (i.e., makes the preset diagnosis rule valid) based on the diagnosis rule setting so as to generate the diagnosis rule data which records a diagnosis rule of "09:00-vaild-IoT0002a-temperature<20☐". Thereafter, at 11:00 p.m., the processor 15 deactivates the set diagnosis rule (i.e., makes the preset diagnosis rule invalid) based on the diagnosis rule setting so as to generate the diagnosis rule data which records a diagnosis rule of "23:00-invaild-IoT0002a-temperature<20☐".

Therefore, if the processor 15 receives the device data from the IoT apparatus 2a via the network interface 11 at 09:20 a.m., and the device data records "09:20-IoT0002a-temperature=19☐", then it means that the time stamp of the device data transmitted by the IoT apparatus 2a is 09:20, the device identifier is IoT0002a, and the state information is a temperature of 19☐. Next, the processor 15 diagnoses the device data according to the diagnosis rule that the temperature is set to be lower than 20☐ by the user for the IoT apparatus 2a and obtains a diagnosis log data "09:20-IoT0002a-true", and this means that the device data uploaded by the IoT apparatus 2a at 09:20 a.m. meets the diagnosis rule that the temperature is lower than 20☐.

It can be conceived that the data processing apparatus 1 continuously generates the diagnosis rule data and receives the device data from the IoT apparatus 2a. Each time the device data transmitted by the IoT apparatus 2a is received, the processor 15 diagnoses the device data to generate the diagnosis log data according to the diagnosis rule that is valid and associated with the IoT apparatus 2a. Therefore, in order to securely store the device data, the diagnosis rule data and the diagnosis log data, the processor 15 packages the device data received based on a first preset data amount to generate a plurality of device files and a first hash value of each of the device files, packages the diagnosis log data generated after diagnosing the device data based on a second preset data amount to generate a plurality of diagnosis log files and a second hash value of each of the diagnosis log files, and packages the diagnosis rule data based on a third preset data amount to generate a plurality of diagnosis rule files and a third hash value of each of the diagnosis rule files.

The processor 15 further stores each of the device files, each of the diagnosis log files and each of the diagnosis rule files to the interplanetary file system 5 so that the data loss due to the damage to the data processing apparatus 1 could be prevented by such decentralized and distributed storing mechanism. Meanwhile, the processor 15 further stores each of the first hash values, each of the second hash values and each of the third hash values to the blockchain system 4 through a smart contract SC so that the hash values cannot be tampered easily. The first hash values, the second hash values and the third hash values may be used in the future for verifying the corresponding device files, diagnosis log files and diagnosis rule files.

Figure 3:
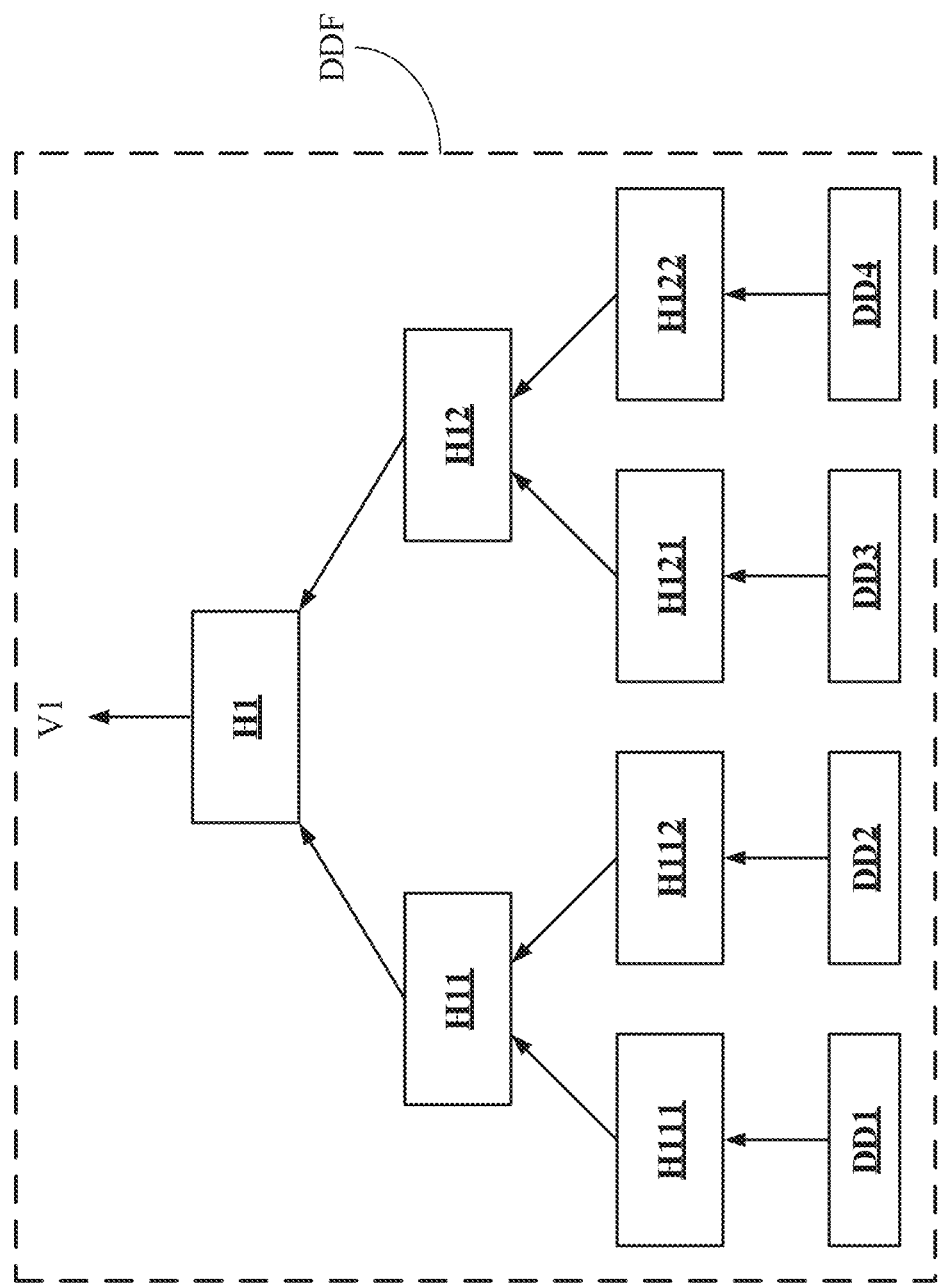
FIG. 3 is a schematic view of an indexed Merkle tree data structure of each device file according to the present invention.

For example, referring to FIG. 3, each device file DDF records the device data DD1 to DD4 corresponding to the first preset data amount in an indexed Merkle tree data structure. In FIG. 3, it is assumed that the first preset data amount is 4, and at the first stage, the processor 15 passes the device data DD1 through a hash function H111, passes the device data DD2 through a hash function H112, passes the device data DD3 through a hash function H121, and passes the device data DD4 through a hash function H122.

Next, at the second stage, the processor 15 passes the hash values generated from the hash function H111 and the hash function H112 through a hash function H11 together, and passes the hash values generated by the hash function H121 and the hash function H122 through a hash function H12 together. Finally, the processor 15 passes the hash values generated from the hash function H11 and the hash function H12 through a hash function H1 together to obtain a first hash value V1 which is a root hash value of the indexed Merkle tree data structure for the device file DDF.

Figure 4:
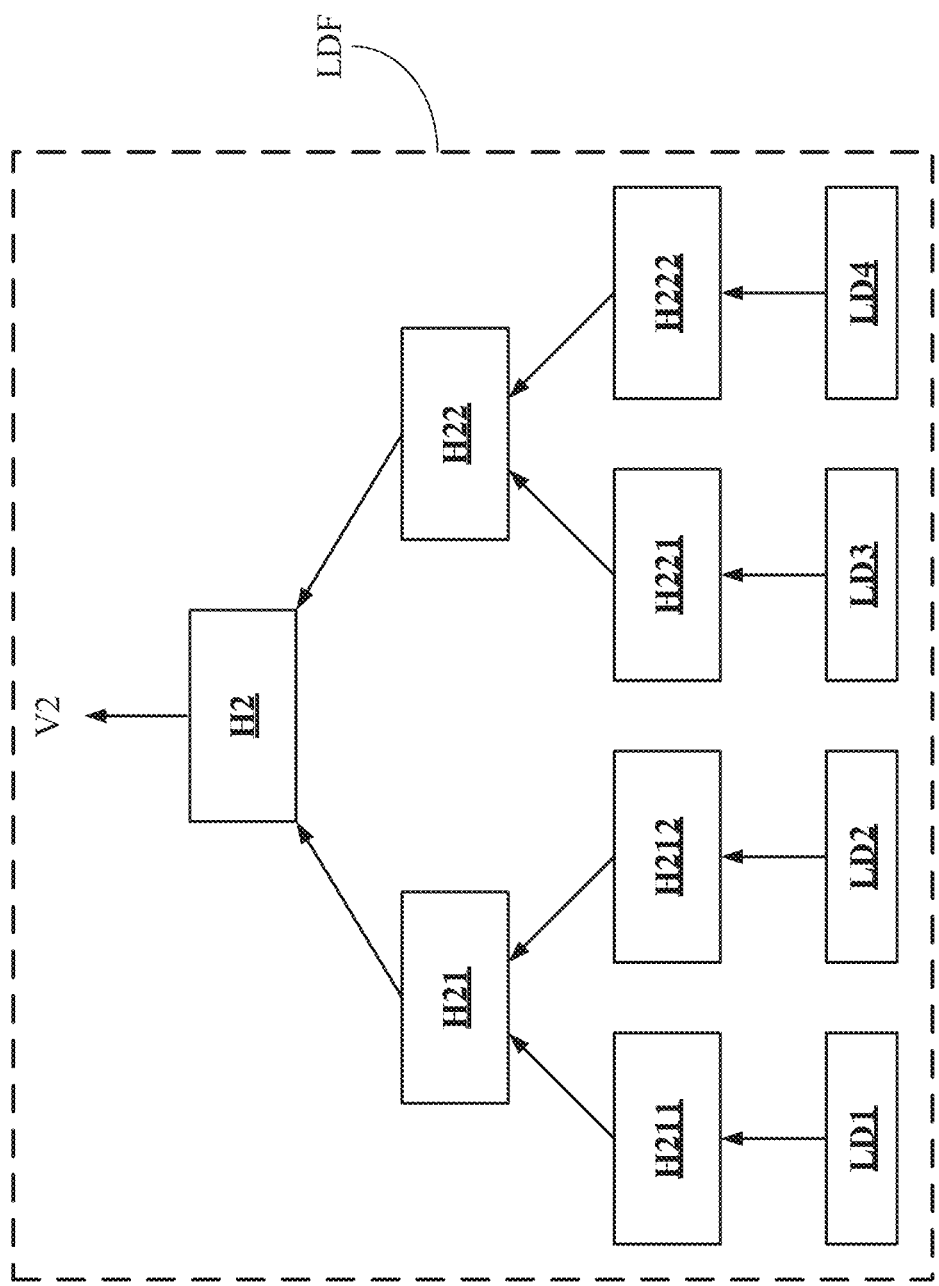
FIG. 4 is a schematic view of an indexed Merkle tree data structure of each diagnosis log file according to the present invention.

Similarly, in FIG. 4, each diagnosis log file LDF also records the diagnosis log data LD1 to LD4 corresponding to the second preset data amount in an indexed Merkle tree data structure. In FIG. 4, it is assumed that the second preset data amount is 4 pieces of diagnosis log data, and at the first stage, the processor 15 passes the diagnosis log data LD1 through a hash function H211, passes the diagnosis log data LD2 through a hash function H212, passes the diagnosis log data LD3 through a hash function H221, and passes the diagnosis log data LD4 through a hash function H222.

Next, at the second stage, the processor 15 passes the hash values generated from the hash function H211 and the hash function H212 through a hash function H21 together, and passes the hash values generated from the hash function H221 and the hash function H222 through a hash function H22 together. Finally, the processor 15 passes the hash values generated from the hash function H21 and the hash function H22 through the hash function H2 together to obtain a second hash value V2 which is a root hash value of the indexed Merkle tree data structure for diagnosing the log file LDF.

Figure 5:
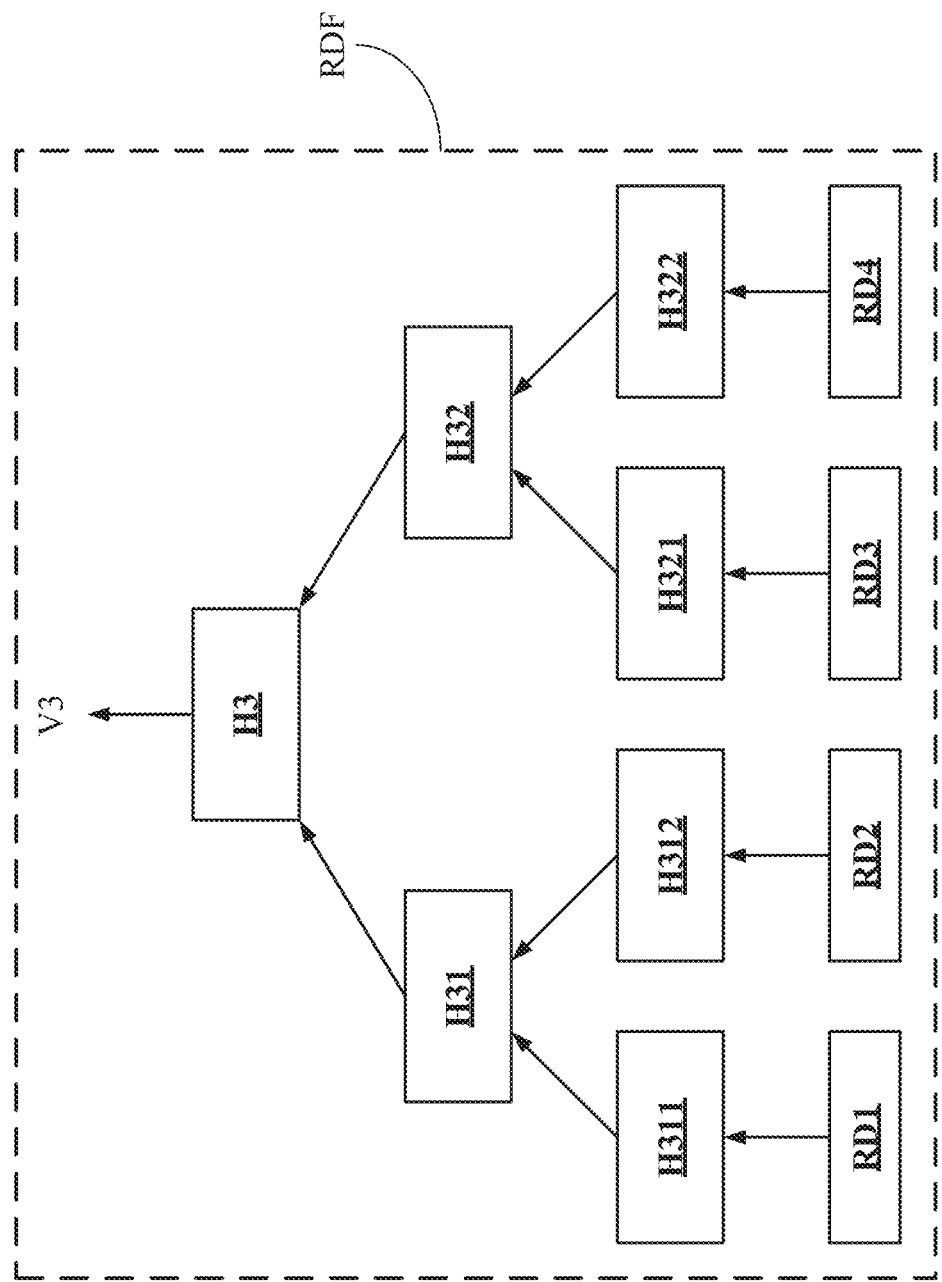
FIG. 5 is a schematic view of an indexed Merkle tree data structure of each diagnosis rule file according to the present invention.

In FIG. 5, each diagnosis rule file RDF also records the diagnosis rule data RD1 to RD4 corresponding to the third preset data amount in an indexed Merkle tree data structure. In FIG. 5, it is assumed that the third preset data amount is 4 pieces of diagnosis rule data, and at the first stage, the processor 15 passes the diagnosis log data RD1 through a hash function H311, passes the diagnosis log data RD2 through a hash function H312, passes the diagnosis log data RD3 through a hash function H321, and passes the diagnosis log data RD4 through a hash function H322.

Next, at the second stage, the processor 15 passes the hash values generated from the hash function H311 and the hash function H312 through a hash function H31 together, and passes the hash values generated from the hash function H321 and the hash function H322 through a hash function H32 together. Finally, the processor 15 passes the hash values generated from the hash function H31 and the hash function H32 through a hash function H3 together to obtain a third hash value V3 which is a root hash value of the indexed Merkle tree data structure for diagnosing the log file RDF.

It shall be appreciated that, it is assumed that the first preset data amount, the second preset data amount and the third preset data amount are the same in this embodiment. However, in other embodiments, the first preset data amount, the second preset data amount and the third preset data amount may be decided respectively based on other factors such as the data amount, the charge for packaging or the like. In other words, the first preset data amount, the second preset data amount and the third preset data amount may also be different, and how to set the first preset data amount, the second preset data amount and the third preset data amount shall be appreciated by those of ordinary skill in the art based on the above description, and thus will not be further described herein.

Moreover, the aforesaid indexed Merkle tree data structure is only an implementation for storing data according to the present invention. In other embodiments, the data may also be stored via other data structures to generate corresponding hash values. For example, the first hash value V1 may also be generated by passing the device data DD1 to DD4 through a hash function together, the first hash value V2 may also be generated by passing the diagnosis log data LD1 to LD4 through a hash function together, and the third hash value V3 may also be generated by passing the diagnosis rule data RD1 to RD4 through a hash function together.

Figure 6:
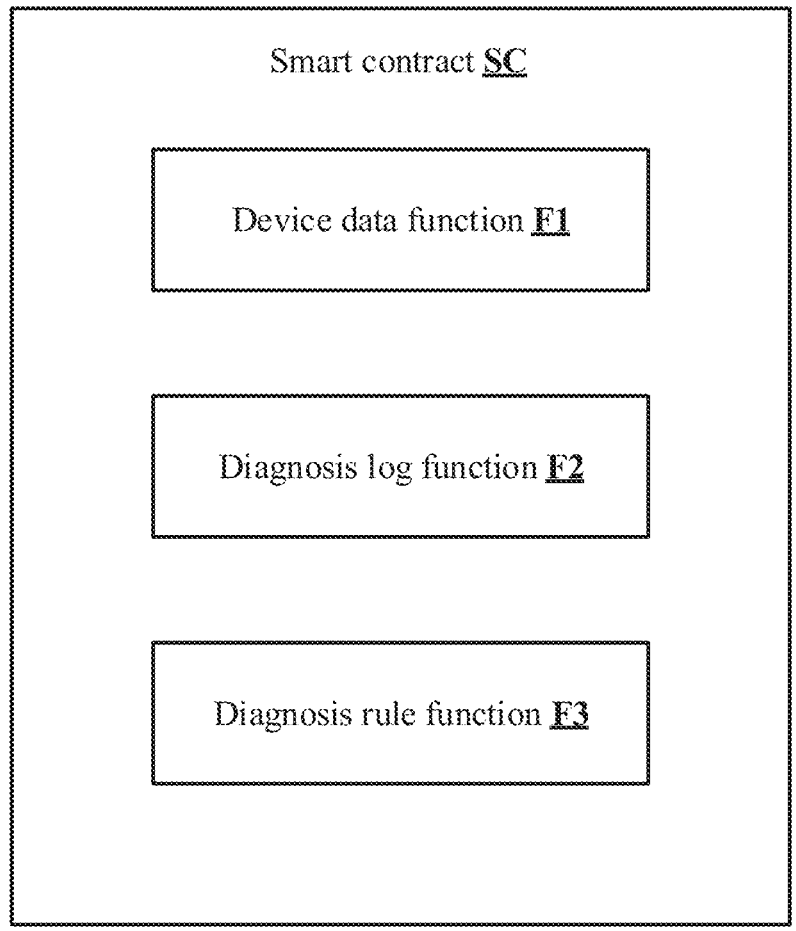
FIG. 6 is a schematic view of a smart contract SC according to the present invention.

Therefore, the processor 15 may store each of the device files DDF, each of the diagnosis log files LDF and each of the diagnosis rule files RDF to the interplanetary file system 5, and store the corresponding first hash values V1, the corresponding second hash values V2 and the corresponding third hash values V3 to the blockchain system 4 respectively through the device data function F1, the diagnosis log function F2 and the diagnosis rule function F3 in the smart contract SC (as shown in FIG. 6), thereby achieving the purpose of decentralized storage, data security and traceability.

Figure 7:
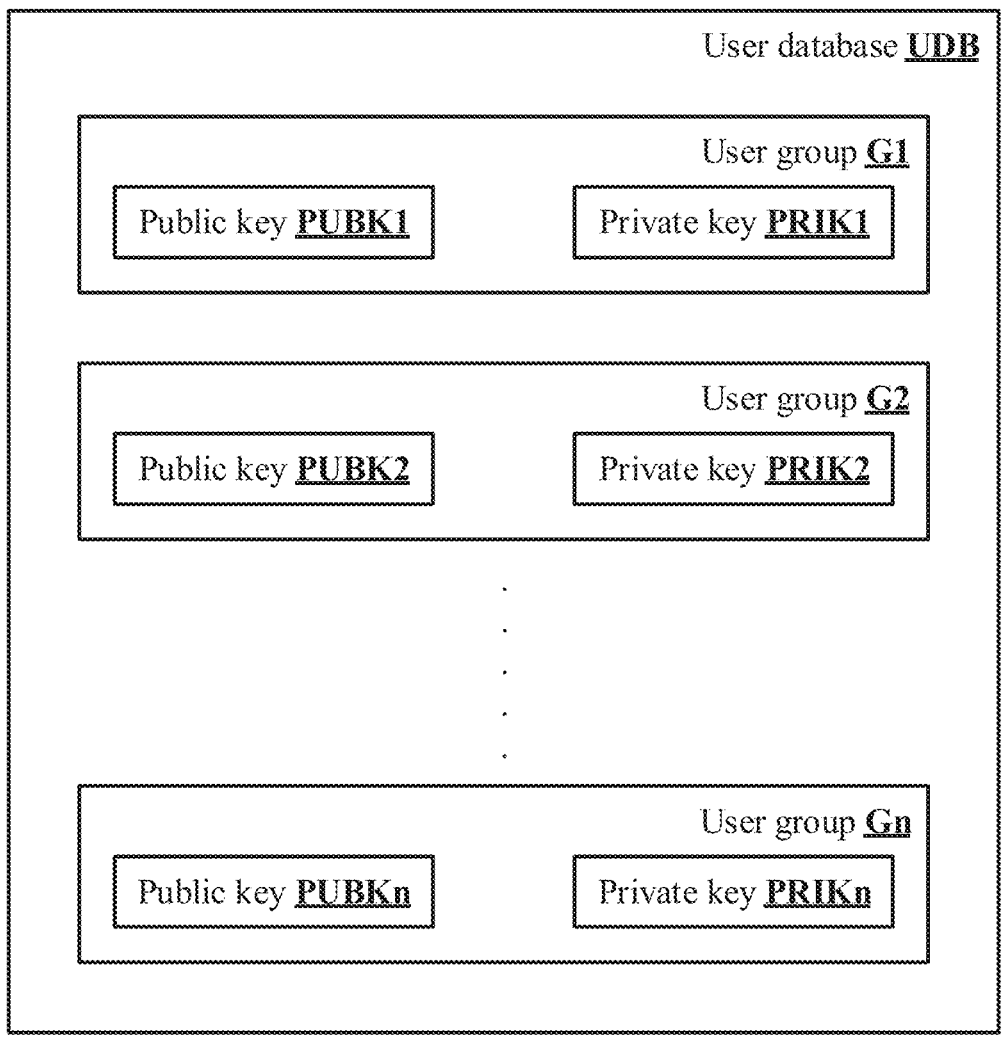
FIG. 7 is a schematic view of a user database UDB according to the present invention.

Referring to FIG. 7 for a second embodiment of the present invention, and FIG. 7 is a schematic view of a user database UDB according to the present invention. In this embodiment, the user database UDB further records a plurality of user groups G1 to Gn and public keys PUBK1 to PUBKn and private keys PRIK1 to PRIKn of the user groups G1 to Gn, wherein n is a positive integer. Each of the IoT apparatuses 2a, 2b and 2c belongs to one of the user groups G1 to Gn. In detail, after being registered with the data processing apparatus 1, each of the IoT apparatuses 2a, 2b and 2c will be assigned to one of the user groups G1 to Gn. The user groups may be classified based on IoT apparatuses of different companies, IoT apparatuses of different departments, and IoT apparatuses of different buildings, but not limited thereto.

For example, all of the IoT apparatuses in the user group G1 may be smart thermometers and owned by a same transport company, and each of the smart thermometers is installed within a freezer car to regularly report the temperature within a container of the freezer car. Therefore, the time point at which the diagnosis rule is activated may be a specific time directly set by a user (a manager of the transport company), and the diagnosis rule may also be activated by setting a specific event for triggering (e.g., the start of the freezer car). How the diagnosis rule is activated (i.e., becomes valid) based on the presetting of the user shall be appreciated by those of ordinary skill in the art based on the above description, and thus will not be further described herein.

Since different user groups may belong to different organizations, the data processing apparatus 1 uses different keys to perform encryption and decryption for different user groups in order to increase the security of data transmission. Specifically, as shown in FIG. 7, different user groups are provided with different public keys and private keys, e.g., the user group G1 is provided with the public key PUBK1 and the private key PRIK1, the user group G2 is provided with the public key PUBK2 and the private key PRIK2, and the user group Gn is provided with the public key PUBKn and the private key PRIKn. The data processing apparatus 1 transmits the public key of each user group to the corresponding IoT apparatus so that the IoT apparatus encrypts the device data using the public key of the user group to which the IoT apparatus belongs to and then upload the encrypted device data to the data processing apparatus 1. After the processor 15 receives the device data via the network interface 11, the processor 15 decrypts the device data using the private key of the user group to which the IoT apparatus belongs.

For example, referring to FIG. 2 and FIG. 7 together, if the IoT apparatus 2b belongs to the user group G2, then the data processing apparatus 1 will transmit the public key PUBK2 of the user group G2 to the IoT apparatus 2b after the IoT apparatus 2b is registered. If the IoT apparatus 2b intends to transmit the device data, the IoT apparatus 2b needs to first use the public key PUBK2 to encrypt the device data and then upload the encrypted device data to the data processing apparatus 1. After receiving the device data of the IoT apparatus 2b, the data processing apparatus 1 uses the private key PRIK2 to decrypt the received device data.

It shall be appreciated that, the IoT apparatus may reserve the device identifier as a plaintext for displaying when the IoT apparatus encrypts the device data so that the data processing apparatus 1 can determine to which user group the IoT apparatus belongs based on the device identifier thereof. Moreover, the IoT apparatus may also encrypt the whole device data. In this case, after the IoT apparatus is registered, the data processing apparatus 1 will record the Internet protocol address (IP address) or the Media access control address (MAC address) of the IoT apparatus, so to which user group the IoT apparatus belongs may be determined according to the IP address or the MAC address.

Please still refer to FIG. 1 to FIG. 7 for a third embodiment of the present invention. This embodiment is an extension of the first embodiment and the second embodiment. In this embodiment, for each of the IoT apparatuses, the processor 15 may package the device data received from the IoT apparatus into device files, package the corresponding diagnosis log data into diagnosis log files and package the corresponding diagnosis rule data into diagnosis rule files, and encrypt each of the device files, each of the diagnosis log files and each of the diagnosis rule files using the public key of the user group to which the IoT apparatus belongs to. Thereafter, the processor 15 stores the encrypted device files, the diagnosis log files and the diagnosis rule files to the interplanetary file system 5.

For example, the device data DD1 to DD4 in the device file DDF are all generated by the IoT apparatus 2a, the diagnosis log data LD1 to LD4 in the diagnosis log file LDF are associated with the device data DD1 to DD4, and the diagnosis rule data RD1 to RD4 of the diagnosis rule file RDF are all diagnosis rules associated with the IoT apparatus 2a. Therefore, if the IoT apparatus 2a belongs to the user group G1, then the processor 15 uses the public key PUBK1 of the user group G1 to encrypt the device file DDF, the diagnosis log file LDF and the diagnosis rule file RDF after generating the device file DDF, the diagnosis log file LDF and the diagnosis rule file RDF.

Moreover, the processor 15 may also package the device data, the diagnosis log data and the diagnosis rule data for each of the user groups. For example, if the IoT apparatuses 2b and 2c belong to the user group G2, then the device data DD1 to DD4 in the device file DDF comprise the device data generated by the IoT apparatuses 2b and 2c, the diagnosis log data LD1 to LD4 in the diagnosis log file LDF are associated with the device data DD1 to DD4, and the diagnosis rule data RD1 to RD4 of the diagnosis rule file RDF are diagnosis rules associated with the IoT apparatuses 2b and 2c. Therefore, the processor 15 uses the public key PUBK2 of the user group G2 to encrypt the device file DDF, the diagnosis log file LDF and the diagnosis rule file RDF after generating the device file DDF, the diagnosis log file LDF and the diagnosis rule file RDF.

Accordingly, if the data processing apparatus 1 needs to look up the device data, the diagnosis log data and the diagnosis rule data of a specific IoT apparatus or the IoT apparatus of a specific user group in the future, the data processing apparatus 1 may download the corresponding device file DDF, the diagnosis log file LDF and the diagnosis rule file RDF from the interplanetary file system 5, and use the private key of the user group to which the IoT apparatus belongs to decrypt the corresponding files. Meanwhile, the data processing apparatus 1 reads the corresponding first hash value V1, the second hash value V2 and the third hash value V3 from the blockchain system 4 to verify the device file DDF, the diagnosis log file LDF and the diagnosis rule file RDF.

A fourth embodiment of the present invention depicts a data processing method, and a flowchart diagram thereof is as shown in FIG. 8A to FIG. 8B. The data processing method is for use in a data processing apparatus for an Internet of Things (IoT) system, e.g., the data processing apparatus 1 of the aforesaid embodiments. The data processing apparatus comprises a network interface, a storage and a processor. The processor is electrically connected to the network interface and the storage. The network interface is connected to a network and connected to a blockchain system and an interplanetary file system via the network. The storage is configured to store a user database, which records a diagnosis rule setting. The data processing method is executed by the processor and comprises steps as follows.

In step S802, a plurality of device data are received from at least one Internet of Things (IoT) apparatus via the network interface. Each of the device data has a time stamp, a device identifier and a piece of state information. In step S804, the device data is packaged based on a first preset data amount to generate a plurality of device files and a first hash value of each of the device files, each of the device files is stored to the interplanetary file system, and each of the first hash values is stored to the blockchain system through a smart contract.

In step S806, for each of the device data, the state information is diagnosed by using the diagnosis rule associated with the device identifier to generate a diagnosis log data. In step S808, the diagnosis log data is packaged based on a second preset data amount to generate a plurality of diagnosis log files and a second hash value for each of the diagnosis log files, each of the diagnosis log files is stored to the interplanetary file system, and each of the second hash values is stored to the blockchain system through the smart contract.

In step S810, a plurality of diagnosis rule data are generated according to the diagnosis rule setting. Each of the diagnosis rule data records a diagnosis rule, and each of the diagnosis rules is associated with one of the device identifiers. In step S812, the diagnosis rule data is packaged based on a third preset data amount to generate a plurality of diagnosis rule files and a third hash value of each of the diagnosis rule files, each of the diagnosis rule files is stored to the interplanetary file system, and each of the third hash values is stored to the blockchain system through the smart contract.

In other embodiments, the user database further records a plurality of user groups and a public key and a private key of each of the user groups, and the aforesaid at least one IoT apparatus belongs to a first user group among the user groups. Each of the device data is encrypted with the public key of the first user group. Therefore, the data processing method may further comprise the following step of: decrypt each of the device data with the private key of the first user group. Moreover, in another embodiment, the data processing method may further comprise the following step of: encrypting each of the device files, each of the diagnosis log files and each of the diagnosis rule files with the public key.

In addition to the aforesaid steps, the data processing method of the present invention can also execute all the operations described in the aforesaid embodiments and have all the corresponding functions, and how this embodiment executes these operations and has these functions based on the aforesaid embodiments shall be readily appreciated by those of ordinary skill in the art, and thus will not be further described herein.

According to the above descriptions, the data processing mechanism of the present invention packages the device data, the corresponding diagnosis rule and the diagnosis log of the IoT apparatus respectively into files and stores the files to the interplanetary file system, and meanwhile stores the hash values of the files to the blockchain system, thereby achieving the purpose of decentralized storage, data security and traceability. Moreover, the data processing mechanism of the present invention further uses encryption and decryption mechanisms using different keys for IoT apparatuses of different user groups to encrypt and decrypt the data transmitted, thereby providing security in data transmission. Accordingly, the data processing mechanism of the present invention may enable the blockchain system to be applicable in the IoT system without resulting in a high service charge, thereby reducing the operating cost of the service provider and improving the extensibility of the IoT system and the security in data storage.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A data processing apparatus for an Internet of Things (IoT) system, comprising:
   a network interface, being connected to a network and connected to a blockchain system and an interplanetary file system via the network;
   a storage, being configured to store a user database, the user database recording a diagnosis rule setting; and
   a processor, electrically connected to the network interface and the storage, being configured to perform the following operations:
      receiving a plurality of device data from at least one Internet of Things (IoT) apparatus via the network interface, each of the device data having a time stamp, a device identifier and a piece of state information;
      generating a plurality of diagnosis rule data according to the diagnosis rule setting, wherein each of the diagnosis rule data recording a diagnosis rule, and each of the diagnosis rules being associated with one of the device identifiers;
      for each of the device data, diagnosing the state information by using the diagnosis rule associated with the device identifier to generate a diagnosis log data;
      packaging the device data based on a first preset data amount to generate a plurality of device files and a first hash value of each of the device files, storing each of the device files to the interplanetary file system, and storing each of the first hash values to the blockchain system through a smart contract;
      packaging the diagnosis log data based on a second preset data amount to generate a plurality of diagnosis log files and a second hash value of each of the diagnosis log files, storing each of the diagnosis log files to the interplanetary file system, and storing each of the second hash values to the blockchain system via the smart contract; and
      packaging the diagnosis rule data based on a third preset data amount to generate a plurality of diagnosis rule files and a third hash value of each of the diagnosis rule files, storing each of the diagnosis rule files to the interplanetary file system, and storing each of the third hash values to the blockchain system through the smart contract.

2. The data processing apparatus of claim 1, wherein the user database further records a plurality of user groups and a public key and a private key of each of the user groups, the at least one IOT apparatus belongs to a first user group among the user groups, each of the device data is encrypted with the public key of the first user group, and the processor further decrypts each of the device data with the private key of the first user group.

3. The data processing apparatus of claim 2, wherein the processor further encrypts each of the device files, each of the diagnosis log files and each of the diagnosis rule files with the public key.

4. The data processing apparatus of claim 1, wherein the first preset data amount, the second preset data amount and the third preset data amount are the same.

5. The data processing apparatus of claim 1, wherein each of the device files records the device data corresponding to the first preset data amount in an indexed Merkle tree data structure, and the first hash value is a root hash value of the indexed Merkle tree data structure.

6. The data processing apparatus of claim 1, wherein each of the diagnosis log files records the diagnosis log data corresponding to the second preset data amount in an indexed Merkle tree data structure, and the second hash value is a root hash value of the indexed Merkle tree data structure.

7. The data processing apparatus of claim 1, wherein each of the diagnosis rule files records the diagnosis rule data corresponding to the third preset data amount in an indexed Merkle tree data structure, and the third hash value is a root hash value of the indexed Merkle tree data structure.

8. The data processing apparatus of claim 1, wherein the smart contract comprises a device data function, a diagnosis log function and a diagnosis rule function.

9. A data processing method for use in a data processing apparatus for an Internet of Things (IoT) system, the data processing apparatus comprising a network interface, a storage and a processor, the processor being electrically connected to the network interface and the storage, the network interface being connected to a network and connected to a blockchain system and an interplanetary file system via the network, the storage being configured to store a user database, the user database recording a diagnosis rule setting, the data processing method being executed by the processor and comprising:

receiving a plurality of device data from at least one Internet of Things (IoT) apparatus via the network interface, each of the device data having a time stamp, a device identifier and a piece of state information;
  generating a plurality of diagnosis rule data according to the diagnosis rule setting, wherein each of the diagnosis rule data recording a diagnosis rule, and each of the diagnosis rules being associated with one of the device identifiers;
  for each of the device data, diagnosing the state information by using the diagnosis rule associated with the device identifier to generate a diagnosis log data;
  packaging the device data based on a first preset data amount to generate a plurality of device files and a first hash value of each of the device files, storing each of the device files to the interplanetary file system, and storing each of the first hash values to the blockchain system through a smart contract;
  packaging the diagnosis log data based on a second preset data amount to generate a plurality of diagnosis log files and a second hash value of each of the diagnosis log files, storing each of the diagnosis log files to the interplanetary file system, and storing each of the second hash values to the blockchain system through the smart contract; and
  packaging the diagnosis rule data based on a third preset data amount to generate a plurality of diagnosis rule files and a third hash value of each of the diagnosis rule files, storing each of the diagnosis rule files to the interplanetary file system, and storing each of the third hash values to the blockchain system through the smart contract.

10. The data processing method of claim 9, wherein the user database further records a plurality of user groups and a public key and a private key of each of the user groups, the at least one IOT apparatus belongs to a first user group among the user groups, each of the device data is encrypted with the public key of the first user group, and the data processing method further comprises:

decrypting each of the device data with the private key of the first user group.

11. The data processing method of claim 10, further comprising:

encrypting each of the device files, each of the diagnosis log files and each of the diagnosis rule files with the public key.

12. The data processing method of claim 9, wherein the first preset data amount, the second preset data amount and the third preset data amount are the same.

13. The data processing method of claim 9, wherein each of the device files records the device data corresponding to the first preset data amount in an indexed Merkle tree data structure, and the first hash value is a root hash value of the indexed Merkle tree data structure.

14. The data processing method of claim 9, wherein each of the diagnosis log files records the diagnosis log data corresponding to the second preset data amount in an indexed Merkle tree data structure, and the second hash value is a root hash value of the indexed Merkle tree data structure.

15. The data processing method of claim 9, wherein each of the diagnosis rule files records the diagnosis rule data corresponding to the third preset data amount in an indexed Merkle tree data structure, and the third hash value is a root hash value of the indexed Merkle tree data structure.

16. The data processing method of claim 9, wherein the smart contract comprises a device data function, a diagnosis log function and a diagnosis rule function.

* * * * *